US006939523B2

(12) United States Patent
D'Alesandro

(10) Patent No.: US 6,939,523 B2
(45) Date of Patent: Sep. 6, 2005

(54) METHOD OF REMOVING SO₃ FROM FLUE GASES

(75) Inventor: Raymond J. D'Alesandro, Latrobe, PA (US)

(73) Assignee: Chemical Lime Company, Fort Worth, TX (US)

( * ) Notice: Subject to any disclaimer, the term of this patent is extended or adjusted under 35 U.S.C. 154(b) by 146 days.

(21) Appl. No.: 10/315,837

(22) Filed: Dec. 10, 2002

(65) Prior Publication Data

US 2004/0109807 A1 Jun. 10, 2004

(51) Int. Cl.⁷ .............................................. C01F 11/46
(52) U.S. Cl. .................. 423/243.08; 110/345; 423/555
(58) Field of Search .......................... 423/243.08, 555; 110/345

(56) References Cited

U.S. PATENT DOCUMENTS

| | | | |
|---|---|---|---|
| 3,985,860 A | * | 10/1976 | Mandelik et al. ...... 423/243.03 |
| 4,009,244 A | | 2/1977 | Atsukawa et al. |
| 4,107,271 A | | 8/1978 | Atsukawa et al. |
| 4,198,380 A | * | 4/1980 | Kohl ...................... 423/243.08 |
| 4,246,242 A | * | 1/1981 | Butler et al. ................. 423/210 |
| 4,369,167 A | | 1/1983 | Weir, Jr. |
| 4,374,812 A | * | 2/1983 | Atsukawa et al. ..... 423/243.12 |
| 4,504,451 A | * | 3/1985 | Quee et al. .............. 423/243.1 |
| 4,670,224 A | * | 6/1987 | Stehning et al. ............ 422/170 |
| 4,843,980 A | * | 7/1989 | Markham et al. ........... 110/342 |
| 5,284,557 A | | 2/1994 | Ukawa et al. |
| 5,345,884 A | * | 9/1994 | Vandycke et al. .......... 110/345 |
| 5,512,097 A | * | 4/1996 | Emmer ....................... 106/745 |
| 5,565,180 A | | 10/1996 | Spink |
| 5,658,547 A | | 8/1997 | Michalak et al. |
| 5,814,288 A | * | 9/1998 | Madden et al. ......... 423/244.01 |

* cited by examiner

*Primary Examiner*—Wayne A. Langel
(74) *Attorney, Agent, or Firm*—Charles D. Gunter, Jr.

(57) ABSTRACT

A calcium hydroxide slurry is injected into the off gases in the exhaust duct of an industrial plant which burns sulfur containing fuels. The calcium hydroxide slurry reacts with SO₃ produced as a result of the combustion process and forms a primary solid calcium sulfate reaction product. The calcium sulfate can then be removed in a particulate removal station in the plant.

14 Claims, 2 Drawing Sheets

METHOD OF REMOVING SO₃ FROM FLUE GASES

BACKGROUND OF THE INVENTION

1. Field of the Invention

The present invention relates generally to processes for treating industrial exhaust gases to remove sulfur oxides contained therein and, more specifically, to the removal of $SO_3$ from flue gases produced by combustion of carbonaceous fossil and other sulfur-bearing fuels in such industrial processes.

2. Description of the Prior Art

The burning of fossil fuels and other fuels that contain sulfur, including pet coke, will result in the formation of sulfur oxides, most commonly know as SOx. The predominate species of the SOx is $SO_2$, with minor amounts of $SO_3$.

A variety of techniques have been developed over the years for removing SOx from facilities that burn fossil fuel such as coal burning electric generating stations as well as secondary industries operating coal burning or high sulfur oil-burning boilers. When there are high levels of sulfur that must be removed, the use of wet limestone or wet lime scrubbing are common and cost effective methods. This sulfur removal technology is based on removing the SOx from the flue gas at the end of the process. Whether the sulfur is present as either $SO_2$ or SOx is generally not of material importance, since it is the amount of total sulfur removed that is critical to the sulfur removal process.

When lower levels of sulfur are present in the fuel, typically less than 2%, then injection of dry limestone or hydrated lime into the boiler is occasionally practiced. This process tends to be less efficient and thus requires a much higher dosage of calcium reagent to sulfur removed, i.e. Ca/S>2:1 or higher.

Until recently there was little or no concern as to whether the sulfur removed, or the sulfur which remained in the flue gas, was either $SO_2$ or $SO_3$, because most of the sulfur was believe to be $SO_2$.

However, recently there has been a much greater concern regarding the presence of $SO_3$ in the flue gas, even though it is a very small amount compared to the total SOx that is emitted. With the introduction of SCR (selective catalysis reduction) in coal fired power plants to control NOx, the elimination of $SO_3$ has become a critical issue. This is partly due to the fact that an unwanted side reaction of the SCR technology to reduce NOx emissions is the catalytic reaction to form $SO_3$. These higher concentrations of $SO_3$ are surprisingly not being removed by traditional wet limestone or wet lime scrubbing systems, even if higher Ca/S ratios are used. This is an unexpected result considering the fact that $SO_3$ is more reactive than $SO_2$, and thus should be easier to remove as calcium sulfate.

The higher concentrations of $SO_3$ accelerate corrosion of the air-heater, precipitator and dry gas duct components of the power plant. These pollutants are passing through all conventional sulfur removal systems and are causing high opacity plumes that contain fine droplets of sulfuric acid, $H_2SO_4$. This unexpected phenomena is causing major problems at coal fired power plants that are installing SCR systems.

A need exists, therefore, for a method for effectively removing $SO_3$ from exhaust and stack gases of fossil fired power plants.

A need also exists for a method for economically and efficiently retrofitting existing power plants, especially those that burn coal, which provides pollution reduction of $SO_3$ similar to the results achieved using wet scrubbing for $SO_2$ reduction and electrostatic precipitation for particulate removal.

SUMMARY OF THE INVENTION

The method of the invention provides an economical and efficient means for removing $SO_3$ from off gases produced at a fossil fired power plant of the type in which utilizes a fossil fuel as a power source for the plant or in other industrial processes where sulfur containing fuels are combusted. The fuel is burned to fire the plant boilers, thereby producing off gases containing $SO_3$. The off gases are collected in an exhaust duct which is heated by the off gases to an exhaust duct temperature.

A calcium hydroxide slurry of controlled and specified physical and chemical characteristics is injected into the off gases in the exhaust duct at a point in the duct where the exhaust duct temperature is sufficient to evaporate water from the calcium hydroxide slurry but is low enough to avoid decomposing and converting the calcium hydroxide to calcium oxide. The calcium hydroxide reacts with the $SO_3$ to produce calcium sulfate which can be removed downstream in a particulate removal station. Where $SO_3$ levels are increased in the prior art, decreased system efficiency results because of the requirement of having to set air heater exit temperatures in the plant higher, due to the increased $SO_3$ concentrations.

Preferably, the calcium hydroxide slurry is injected at a point in the duct where the exhaust duct temperature is below about 500–600° C. The calcium hydroxide slurry can conveniently be made by slaking quicklime or from lime hydrate. Preferably, the calcium hydroxide slurry is introduced into the exhaust duct through at least one nozzle with compressed air also being introduced into the nozzle to produce a plurality of lime slurry droplets, the lime slurry droplets having a particle size in the range from about 30–100 microns, dependent upon the slurry solids and air pressure utilized. The preferred solids content of the calcium hydroxide slurry so produced is in the range from about 15–35% by weight. A saturated solution of calcium hydroxide can be utilized, if desired.

In cases where the power plant has a wet scrubbing system which utilizes wet slaking of calcium oxide for the removal of oxides of sulfur in off gases, a portion of the wet slaked calcium oxide can be diverted from the wet scrubbing system and injected into the exhaust gas duct prior to the particulate removal system.

DETAILED DESCRIPTION OF THE INVENTION

The present invention relates to a simple and cost effective method for eliminating the large concentration of $SO_3$ formed by SCR systems in fossil fired power plants or if high levels of $SO_3$ are formed in such plants without SCR systems. The invention can also be utilized in other industrial processes where sulfur bearing fuels produce SOx emissions. Thus, those skilled in the art will understand that the invention is not limited to electrical generating power plants but could be applied as well to such industrial processes as cement plant kilns, expanded aggregates, etc.

Figure 1:
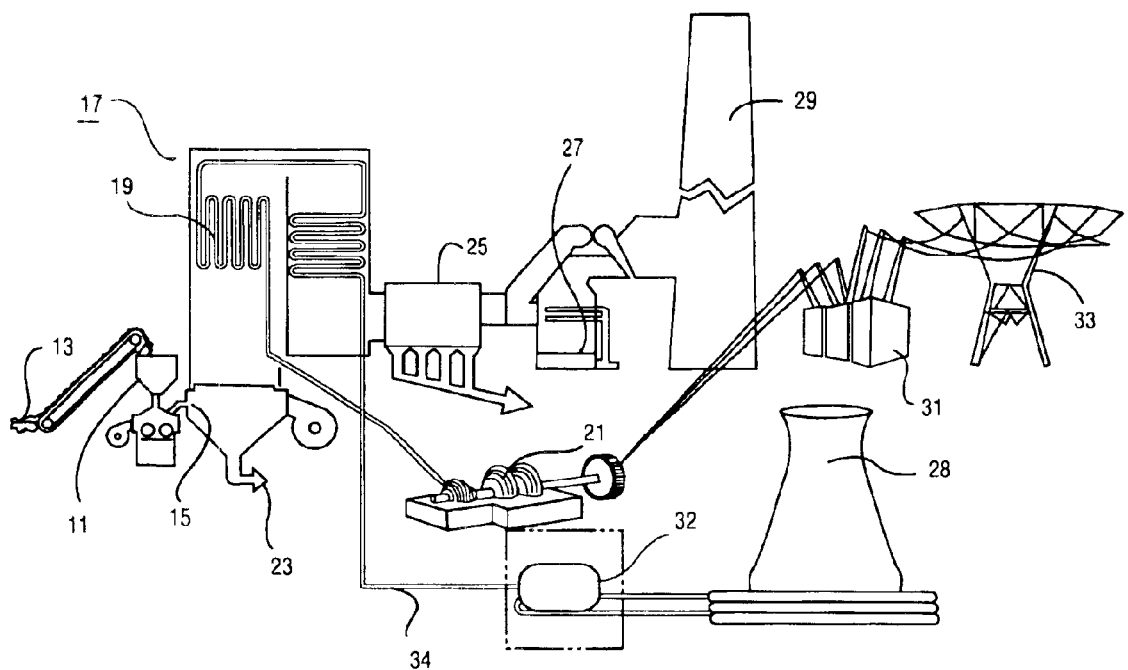
FIG. 1 is a simplified, schematic illustrating the principal component stations of a coal fired power plant of the type to be constructed or retrofitted to practice the method of the invention.

Turning to FIG. 1, there is shown a simplified schematic of a typical coal fired power plant. The power plant includes a primary pulverizer and air fan 11 which receives coal from a conveyer system 13. The pulverizer and fan station 11 prepares the coal for burning by grinding it to a fine powder and drying and mixing it with hot air to create an efficient and combustible fuel source. A burner 15 located in a lower portion of the steam generating boiler 17 introduces the powdered coal into the combustion chamber of the boiler and mixes it with the correct amount of additional air to burn the fuel efficiently. The boiler 17 is a large vessel which contains a tube assembly 19 in which water is heated and converted to steam, the steam then being used to drive the turbine 21. The boiler may also have associated NOx controls such as a selective catalytic reduction system (SCR) which reduces NOx emissions.

A coal combustion byproduct eventually falls to the bottom of the boiler combustion chamber where it is collected and discharged through duct 23. This bottom ash is used to make byproduct materials such as asphalt or concrete, or is disposed of in accordance with applicable law. A precipitator 25 is used to capture particulate material and fly ash down stream of the boiler 17. The fly ash byproduct of the boiler combustion becomes entrained with and is carried out on the hot exhaust gases from the boiler 17. It is collected and has many uses similar to the bottom ash collected at 23.

A scrubber 27 is located downstream of the boiler and is used to remove $SO_2$ from the boiler exhaust gases (flue gases). The exhaust gases then pass to a stack 29 which is used to exhaust and disperse the hot flue gases from the boiler. Emission monitoring equipment monitors the exhaust gases leaving the stack 29. The tower 28 is used to provide cooling water for the generator and to supply water to the boiler tube assembly 19. The primary conduits 30 communicate with a condenser 32 which converts the steam from the turbine back into water, which is recirculated through the secondary conduits 34 to the boiler, where it is again heated to form steam.

The generator 21 transforms the mechanical energy of the turbine into electric energy. A transformer 31 increases the output voltage of the generator while reducing the current to make the transmission of electricity more efficient. The resulting electricity is fed to an electric utility represented by the towers 33.

The present invention concerns the discovery that, if a calcium hydroxide slurry, of controlled and specified physical and chemical characteristics, is injected into the $SO_3$ containing flue gas at a point in the exhaust gas duct where the temperature is sufficient to evaporate the water from the slurry but is low enough not to decompose the calcium hydroxide to calcium oxide, that such injection will result in the formation of solid calcium sulfate (as well as a mixture of calcium sulfite, calcium carbonate, calcium oxide and calcium hydroxide) which can be easily removed by particulate removal systems such as a bag houses or electrostatic precipitators (ESP).

The calcium hydroxide slurries which are used in the practice of the invention can be formed by either slaking quicklime or from lime hydrate. Calcium oxide (CaO) is often referred to as quicklime, while $Ca(OH)_2$ is referred to as hydrated lime—both being referred to as "lime". Quicklime is usually in the form of lumps or pebbles. Dry hydrated lime is usually a powder. Either dry CaO or $Ca(OH)_2$ can be mixed with water to form a "lime" slurry (referred to herein as a calcium hydroxide slurry). In the case of quicklime, the water reacts with the quicklime in an exothermic reaction to form hydrated lime. This is often referred to as slaking. During the slaking of quicklime, large amounts of heat are generated which can significantly raise the temperature of the slurry. The elevated temperatures involved can actually provide benefits for enhanced reaction rates and SOx removal.

Lime slurries can be made in batches or in a continuous process. If a particular user requires a large amount of lime slurry at a particular site, large capacity slaking and storage tanks can be permanently located on the site. These tanks can usually provide a sufficient supply of lime and lime slurry for most operations. In some cases, however, it is not practical to provide permanent slaking or storage tanks for forming lime slurries. In such cases, the limited use of lime may not justify the investment required for construction and maintaining large capacity processing tanks and equipment.

Figure 3:
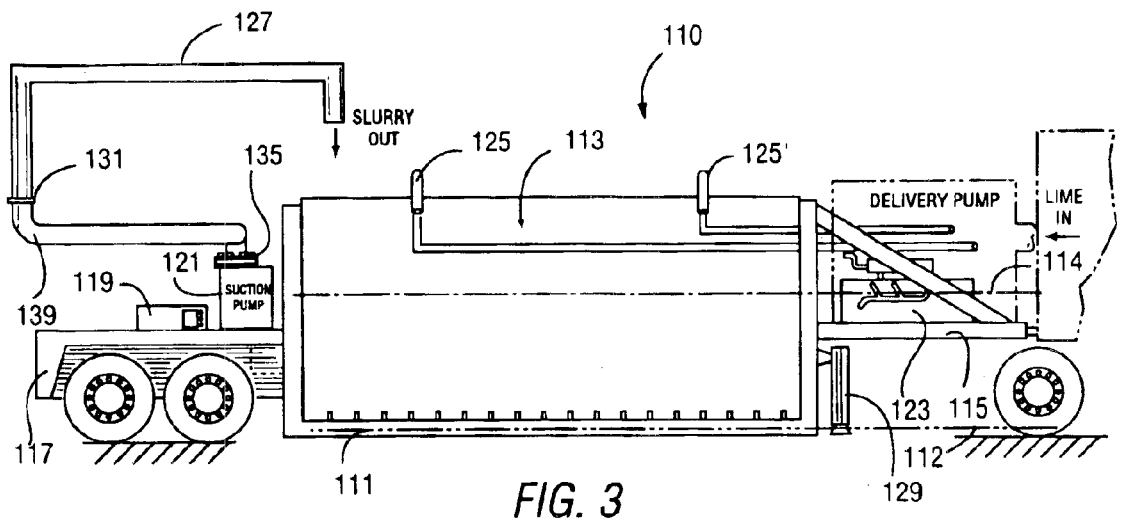
FIG. 3 is a side, partial sectional view of a portable slaking apparatus useful in practicing the method of the invention.
Figure 4:
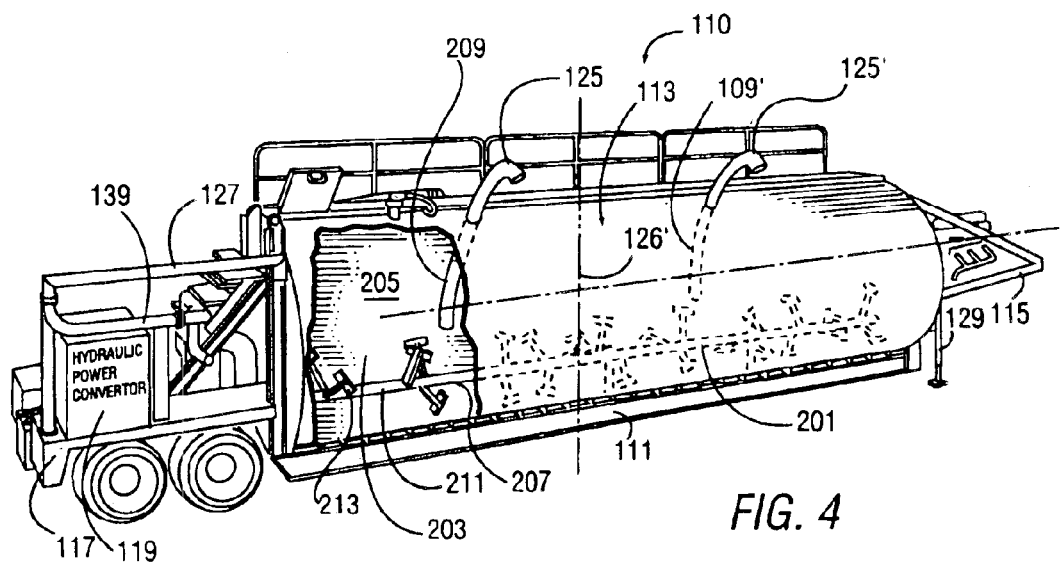
FIG. 4 is another view of the lime slaking apparatus used in the method of the invention.

Portable equipment for forming lime slurries which can be moved from one location to another are described by Teague et al. (U.S. Pat. No. 4,329,090) and Shields et al. (U.S. Pat. No. 5,507,572) and, more recently, in Scholl et al. (U.S. Pat. No. 6,412,974), assigned to the assignee of the present invention. FIGS. 3 and 4 illustrate the Scholl device which can be used to provide the calcium hydroxide slurry needed to practice the invention. The apparatus 110 includes a unitary frame 111 that is substantially parallel to the ground, road, or highway when in use. Tank body 113 is attached to the frame 111, and has a horizontal axis 114 parallel to the horizontal axis 112 of the frame. The tank body has an exterior surface 201 and an interior surface 203 (FIG. 4). The tank body forms at least one mixing chamber 205. The tank body is formed such that the temperature of the hydration reaction within can be controlled. The tank radiates heat generated by the reaction, and the rate of addition of the solid lime can further control the temperature. Thus, the walls of the tank body serve as one means of controlling the reaction temperature, the walls easily radiating the heat generated within the mixing chamber 205 to the external surroundings.

Within the mixing chamber 205 is the mixer 207 (FIG. 4), the mixer in the present embodiment being an auger with a plurality of paddles 213 extending perpendicularly along the shaft 211. The mixer is driven by a hydraulic power unit (not shown) located on either the forward or rear platforms, the shaft 211 being driven to turn the paddles. The liquid and solid additives will fill the mixing chamber 205 to substantially cover the mixer. Once the mixing auger is activated it will sufficiently agitate the slurry, thus facilitating the hydration reaction and creating a more consistent mix of material.

Referring back to FIG. 3, forward platform 115 is used to contain power unit 123. Power unit 123 is a combustion engine, typically being a diesel engine. The combustion engine 123 serves to power all other devices on the apparatus indirectly; the combustion engine is coupled to the hydraulic power converter 119 that converts the torque of the combustion engine drive shaft into hydraulic power. This hydraulic power is then communicated through hydraulic lines to other hydraulic power units on the apparatus, such as, for example, hydraulic landing cylinder 129, suction pump 121, and a delivery pump (not shown). The suction pump 121 is used to draw slurry from the tank 113 to primary tube 139 and delivery outlet 127, while the delivery pump is used to draw solid lime from an external source into the tank 113 through inlets 125 and/or 125'.

The tank body 113 can be one single compartment or can be divided into separate compartments. Generally, the tank body is one compartment. In a multi-compartment embodiment, one compartment can be for the initial reaction and mixing of the lime and water, and another compartment can be used to hold the reacted and ready to use slurry so that a continuous feed of slurry can be provided. The pump 121 in that case would pump slurry from the compartment holding slaked lime to the delivery outlet 127. Another pump would be provided to pump the slaked lime from the reaction compartment to the holding compartment.

In order to expedite the delivery of the quicklime solid to the apparatus, at least two inlets 125 and 125' are provided for each side of the apparatus 110. The inlets penetrate the tank body 113 at spaced apart vertical locations on the external cylindrical sidewall thereof. The spaced locations are above an imaginary midline (126 in FIG. 3) drawn to intersect the cylindrical sidewall and divide the sidewall into quadrants. The horizontal spacing of the inlets is determined by the nature of the delivery means, i.e., the size of the delivery truck utilized, etc. Thus, a truck can pull alongside either side of the apparatus 110, and hoses can be attached to the inlets 125 and 125'. The inlets are arranged such that the quicklime is pumped below the surface of the water level inside the tank body 113. This is accomplished by providing tank inlet extensions 209 and 209' (FIG. 3), the extensions protruding from the inlets 125 and 125' down into the water within the tank. This improves the mixing of the solid and the water in the tank and prevents the lime dust from becoming airborne.

Once the quicklime is added to water inside the tank, the mixture is agitated using a mixing device such as auger 207. The augers are driven by a hydraulic motor attached to the platform 115 or 117.

The reacted, hot slurry is then pumped by suction pump 121 from the tank body 113 to delivery outlet 127. The delivery outlet is shown in its assembled delivery position in FIG. 3, and in a disassembled, traveling position in FIG. 4. The delivery outlet is a rigid tube that is coupled to primary tube 139 through joint 131. Primary tube 139 is coupled to the pump 121 though joint 135. In use, the tank 113 is filled with water from a suitable water source. When the tank body 113 is filled with water, the quicklime or hydrated lime is then blown or otherwise introduced into the tank through inlet(s) 125 and/or 125' below the water level inside the tank through 209 and 209'. Simultaneous to this, the mixture is stirred by activation of the mixing device, or augers 207.

The amount of lime solids added to the tank 113 may range between 20–45% by weight to that of the total lime slurry. For example, 158,000 lbs. of water may be used to fill the tank to a preselected level. To this maybe added 50,000 lbs. of lime. The lime used may be either quicklime or hydrated lime. High calcium lime is usually preferable for most applications, although dolomitic lime can be used. The lime may have impurities but will ordinarily be better than 90% CaO or $Ca(OH)_2$, depending on the type of lime used. The preferred solids content of the resulting slurry will range from about 15–35% by weight, based on the total weight of slurry.

By whatever means the slurry is obtained, the lime slurry is then injected into the exhaust gas duct from the steam boiler at a point at which the exhaust gas duct temperature is within a desired range. Generally, the calcium hydroxide slurry will be injected into the duct where the temperature is below about 500–600° C.

Figure 2:
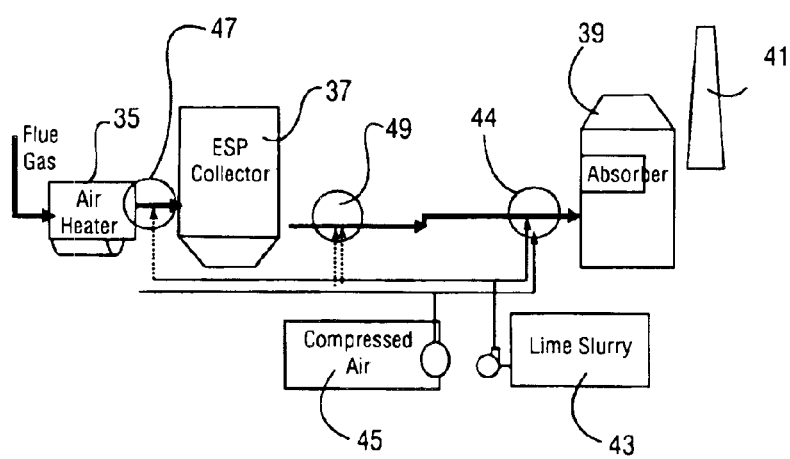
FIG. 2 is a simplified schematic illustrating the method of the invention'

FIG. 2 shows one point at which the lime slurry can be introduced into the exhaust gas duct. It will be understood by those skilled in the art that the example shown in FIG. 2 is exemplary in nature only and is not intended to be limiting of the invention. In FIG. 2, the flue gas passes from the boiler to an air heater 35 and from there to an electrostatic precipitator 37 before entering the absorber 39 and being exhausted to the stack 41. The lime slurry 43 is pumped through dual nozzles into an injection point 44 upstream of the absorber 39. Compressed air from a source 45 is also introduced into the nozzles to produce a lime slurry droplet with a particle size in the range from about 40–50 micron. The atomized slurry is sprayed co-current with the off gas stream, dried and entered into the absorber. For the particular application illustrated, this operation was accomplished in less than one second retention time. A visible plume from the stack was eliminated. In some states "smoke watchers" are considered official and check for such visible plumes. The injection points 47, 49 can also be utilized to inject lime slurry into the exhaust gas duct.

In some cases, where the power plant has a wet scrubbing system (such as scrubber 27 in FIG. 1) which utilizes wet slaking of calcium oxide for the removal of oxides of sulfur in off gases, a portion of the wet slaked calcium oxide can be diverted from the wet scrubbing system and injected into the exhaust gas duct prior to the particulate removal system.

The present invention offers advantages over the use of dry lime injection. The use of dry injection of solid calcium hydroxide to remove $SO_3$ is feasible but it does not have the flexibility of the present invention. Dry injection of solid calcium hydroxide requires sophisticated systems of storage, injection and controls. Calcium hydroxide is a fine powder that tends to form clumps and is difficult to disperse into its individual particles. The agglomerated clumps of solid calcium hydroxide when injected dry into the flue gas stream will likely not be in the optimum size to efficiently and completely react with the $SO_3$ in the flue gas. The ability to control the multi-port dry injection of calcium hydroxide on a continuous basis is difficult.

The use of calcium hydroxide slurry injection offers several non-obvious advantages over the dry injection of solid calcium hydroxide. The gases in question are very soluble in water and this fact offers more contact with the dissolved calcium ion and solid calcium surface for enhanced removals and reagent utilization.

The ability to inject a slurry of calcium hydroxide into gas stream at multiple ports is significantly easier. By controlling the viscosity and solids content of the calcium hydroxide slurry, also atomizing air if necessary, one can control the droplet size and the dispersability of the individual calcium hydroxide particles. By controlling the droplet size and dispersability of the calcium hydroxide, the ability to absorb and react with the small amount of $SO_3$ in the presence of larger amounts of $SO_2$ and $CO_2$ are greatly enhanced.

The evaporation of the water from the calcium hydroxide slurry after injection into the flue gas changes the micro environment surrounding the calcium hydroxide sorbent and thus has the ability to enhance the absorption and reaction process by providing a path way from $SO_3$—$H_2SO_4$—$CaSO_4$. The evaporation of the water from the injected calcium hydroxide slurry not only causes a higher concentration of water vapor surrounding the calcium hydroxide sorbent particles, it also lowers the temperature surrounding the calcium hydroxide sorbent particles thus promoting $SO_3$ sorption. This combination of physical and chemical changes surrounding the calcium hydroxide sorbent can not be achieved by the dry injection of calcium hydroxide.

The capital and operating costs associated with a calcium hydroxide slurry system can be significantly less than would be required by a dry calcium hydroxide system.

Calcium hydroxide slurry, like dry calcium hydroxide is a product of commerce, but unlike dry calcium hydroxide, it offers several different modes of production and delivery. Since dry calcium hydroxide is a fine, white, low density powder it is almost always more expensive on an equivalent "Calcium" basis than calcium oxide, quicklime, and typically has higher delivery costs. As discussed above, calcium hydroxide slurry can be made from dry calcium hydroxide, or more importantly and less expensively directly from calcium oxide, quicklime. For facilities that would require only small amounts of calcium hydroxide for the removal of $SO_3$, calcium hydroxide slurry can be purchased "as is" thus eliminating most of the capital and operating costs associated with a typical dry calcium hydroxide storage system.

In current fossil fuel combustion systems that employ traditional wet lime scrubbing and are experiencing $SO_3$ problems, either because of installation of NOx control systems, such as SCR or because of other $SO_3$ concerns, this invention provides a simple and inexpensive method of capturing the $SO_3$. Injection of the "on site" produced calcium hydroxide slurry will significantly reduce the concentration of $SO_3$ prior to the traditional wet scrubbing, thus eliminating the $SO_3$ plume "problem" without the installation of a dry calcium hydroxide injection system.

In wet limestone scrubbing sulfur removal systems, the addition of a calcium hydroxide slurry duct injection system will remove the $SO_3$ prior to the post FGD wet limestone scrubbing, thus improving the overall efficiency of the combined sulfur removal processes. The use of residual lime from $SO_3$ removal provides enhanced overall $SO_2/SO_3$ removal in such systems.

Because calcium hydroxide has a solubility of approximately 0.2.% in cold water, the use of a saturated calcium hydroxide solution can also be used to remove $SO_3$ when large amounts of water can be added to the flue gas without causing down stream problems. This saturated calcium hydroxide solution could yield improved $SO_3$ removal efficiency.

While the invention has been shown in only one of its forms, it is not thus limited but is susceptible to various changes and modifications without departing from the spirit thereof.

What is claimed is:

1. A method of removing $SO_3$ from off gases produced at an industrial plant which combusts sulfur containing fuels, the method comprising the steps of:

providing a sulfur containing fuel as a power source for the plant;

burning the fuel at the plant, thereby producing off gases containing $SO_3$, and collecting the off gases in an exhaust duct which is heated by the off gases to an exhaust duct temperature;

injecting a calcium hydroxide slurry into the off gases in the exhaust duct at a point in the duct where the exhaust duct temperature is sufficient to evaporate water from the calcium hydroxide slurry but is low enough to avoid decomposing and converting the calcium hydroxide to oxide, the calcium hydroxide reacting with the $SO_3$ to produce calcium sulfate;

removing the calcium sulfate in a particulate removal system;

wherein the industrial plant also has a particulate removal system and a wet scrubbing system and wherein the calcium hydroxide slurry is injected into the exhaust gas upstream from the particulate removal system and from the wet scrubbing system; and wherein the calcium hydroxide slurry is introduced into the exhaust duct through at least one nozzle and wherein compressed air is also introduced into the nozzle to atomize the slurry and produce a plurality of lime slurry droplets, the lime slurry droplets having a particle size in the range from about 30–100 microns.

2. The method of claim 1, wherein the calcium hydroxide slurry being injected at a point in the duct where the exhaust duct temperature is below about 500–600° C.

3. The method of claim 1, wherein the calcium hydroxide slurry is made by slaking quicklime.

4. The method of claim 1, wherein the solids content of the calcium hydroxide slurry is in the range from about 15–45% by weight.

5. The method of claim 1, wherein the calcium hydroxide slurry is made by adding additional water to lime hydrate.

6. The method of claim 1, where the industrial plant wet scrubbing system utilizes wet slaking of calcium oxide for the removal of oxides of sulfur in off gases and wherein a portion of the wet slaked calcium oxide is diverted from the wet scrubbing system and injected into the exhaust gas duct prior to the particulate removal system.

7. The method of claim 1, wherein a saturated solution of calcium hydroxide is injected into the exhaust duct.

8. A method of removing $SO_3$ from off gases produced at a fossil fired power plant having a boiler, an exhaust duct which receives off gases from a combustion chamber of the boiler and a downstream particulate removal station, the method comprising the steps of:

providing a fossil fuel as a power source for the plant;

burning the fossil fuel in the combustion chamber of the boiler at the plant, thereby producing off gases containing $SO_3$, and collecting the off gases in the exhaust duct which is heated by the off gases to an exhaust duct temperature;

injecting a calcium hydroxide slurry into the off gases downstream from the boiler but upstream from the particulate removal station, the calcium hydroxide slurry being injected in the exhaust duct at a point in the duct where the exhaust duct temperature is sufficient to evaporate water from the calcium hydroxide slurry but is low enough to avoid decomposing and converting the calcium hydroxide to calcium oxide, the calcium hydroxide reacting with the SO3 to produce calcium sulfate;

removing the calcium sulfate at the particulate removal station;

wherein the exhaust gas duct passes to an electrostatic precipitator and from the electrostatic precipitator to a flue gas desulfurization absorber, and wherein the calcium hydroxide slurry is injected at a point in the exhaust duct upstream of the electrostatic precipitator; and wherein the calcium hydroxide slurry is introduced into the exhaust duct through at least one nozzle and wherein compressed air is also introduced into the nozzle to atomize the slurry and produce a plurality of lime slurry droplets, the lime slurry droplets having a particle size in the range from about 30–100 microns.

9. The method of claim 8, wherein the calcium hydroxide slurry being injected at a point in the duct where the exhaust duct temperature is below about 500–600° C.

10. The method of claim 8, wherein the calcium hydroxide slurry is made by slaking quicklime.

11. The method of claim 8, wherein the solids content of the calcium hydroxide slurry is in the range from about 15–35% by weight.

12. The method of claim 8, wherein the calcium hydroxide slurry is made by slaking quicklime on site at the plant using a portable slaking tank.

13. The method of claim 8, wherein the power plant has a wet scrubbing system which utilizes wet slaking of calcium oxide for the removal of oxides of sulfur in off gases and wherein a portion of the wet slaked calcium oxide is diverted from the wet scrubbing system and injected into the exhaust gas duct prior to the particulate removal system.

14. The method of claim 8, wherein a saturated solution of calcium hydroxide is injected into the exhaust duct.

* * * * *